June 23, 1959     D. E. GILLUM     2,891,414
ANTI-FRICTION SCREW MEANS
Filed April 22, 1957     2 Sheets-Sheet 1
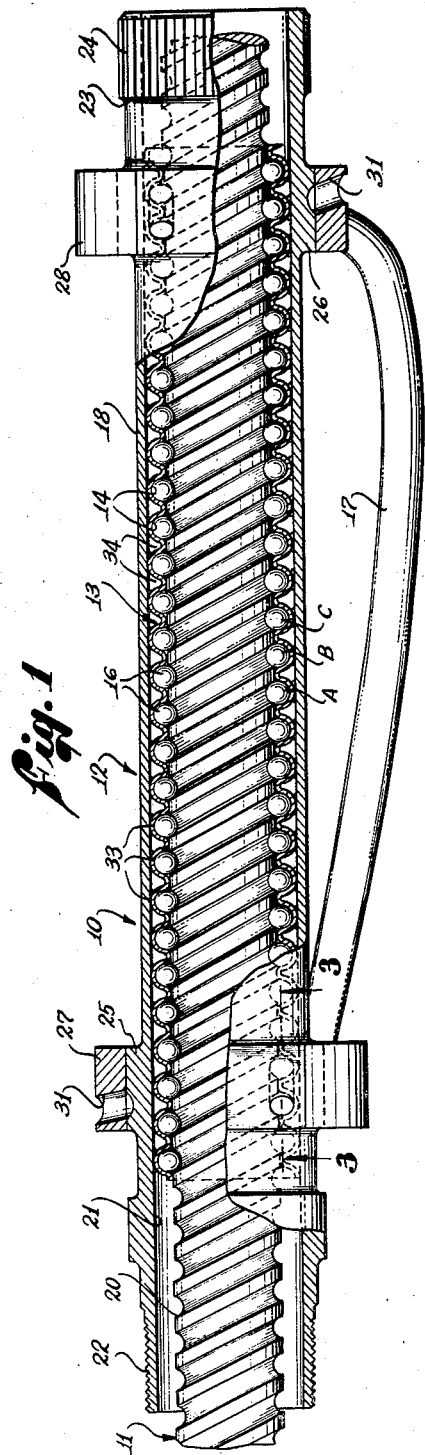
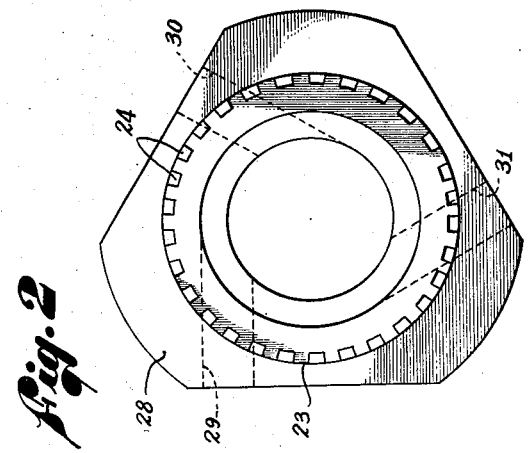
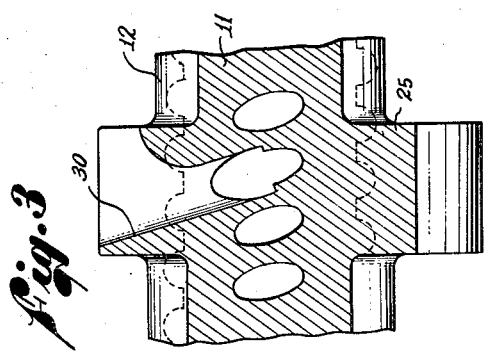
Donald E. Gillum
INVENTOR.
BY *Gulwider Mattingly & Huntley*
*Attorneys*

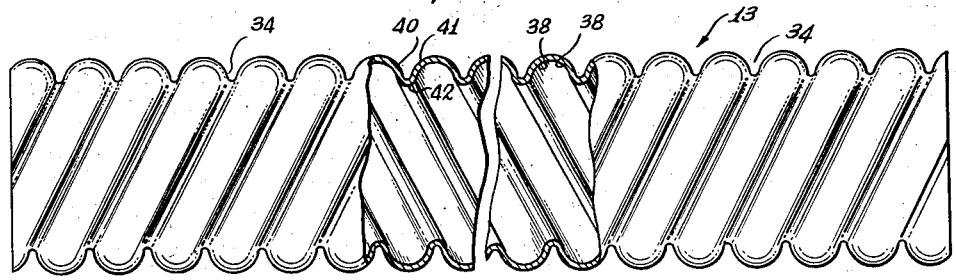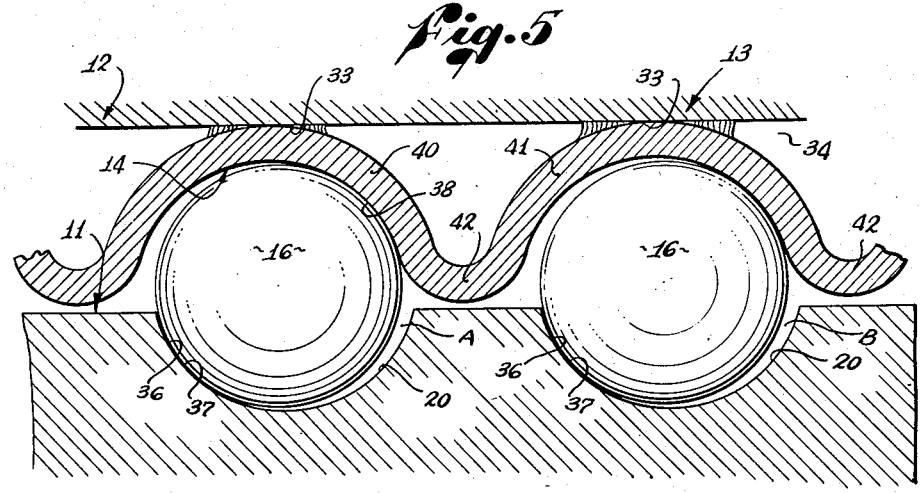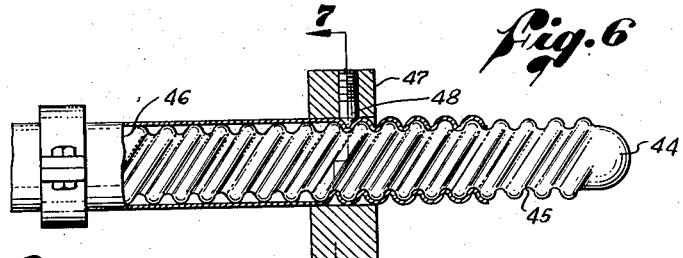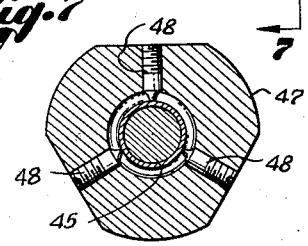

United States Patent Office 2,891,414
Patented June 23, 1959

2,891,414
ANTI-FRICTION SCREW MEANS

Donald E. Gillum, Pompano Beach, Fla., assignor to U.S. Industries, Inc., New York, N.Y., a corporation of Delaware Application April 22, 1957, Serial No. 654,117

7 Claims. (Cl. 74—459)

This invention relates to an anti-friction screw means, and in particular, to a ball-bearing jack screw means capable of transferring axial loads between an elongated housing or nut means and a cooperable screw member. The invention also relates to a method of making the housing or nut means for such a screw means.

Anti-friction screw means have been heretofore proposed wherein an internally threaded rigid metal nut receives an externally threaded screw member, and ball bearings are provided therebetween for transmitting axial loads upon relative movement of the nut and screw member. Such prior proposed screw means are limited in the length of the nut means because of difficulty in accurately machining internal threads in a nut member of a length greater than twice the inner diameter of the nut. When nut means were attempted to be threaded of a length longer than twice the inner diameter of the nut, it was difficult to maintain required tolerances and cost of machining was prohibitive. When the internal spiral grooves were not held to required tolerances, jamming of the ball bearings would occur and desired reduction in frictional resistance was not afforded.

Prior proposed ball bearing screw devices of the type mentioned above were also subject to wear along a virtually line contact of the ball bearing on the inner surfaces of the internal groove. The solid metal of the nut was virtually rigid and was not designed to resiliently yield to the loads imposed thereon by the ball bearings. It is understood that the phrase virtually line contact contemplates minute flattening which occurs at the contact point between two solid elastic curved bodies. Slight discrepancies in machining of the internal groove would cause uneven wearing of the internal spiral raceway. As a result, loading of the ball bearings became uneven and loss of efficiency occurred.

This invention contemplates an anti-friction screw means utilizing ball bearings wherein the housing or nut means providing an internal spiral groove may be made of any selected length and wherein axial loads are distributed more evenly and uniformly regardless of differences in manufacturing tolerances in the forming of the internal spiral groove. The invention contemplates the construction of a housing or nut means having an internal spiral groove in which the heretofore prohibitive high cost of machining is eliminated.

Generally speaking, the advantages of greater length of a housing member and more uniform loading of ball bearings utilized in the screw means of this invention are accomplished by the novel construction of the housing or nut means. The housing or nut means of this invention include a housing member having a bore for receiving a volute sleeve element of relatively resilient elastic, flexible material, as compared to the screw member, of any desired length, the sleeve element being secured to the housing member in such a manner that resilient wall sections of the groove provided by the sleeve element can resiliently yield to forces transmitted thereby by the ball bearing for distributing load more uniformly among the ball bearings. The volute sleeve element is preferably formed from a cylindrical tube having walls of thin uniform section.

The primary object of this invention, therefore, is to disclose and provide an improved anti-friction screw means of ball bearing type which is not limited by present machining practices as to size and capacity, and which provides an effective, efficient, cooperable relation between ball bearings and resilient yieldable walls of a spiral groove supported by a housing member.

An object of this invention is to disclose and provide a novel elongated housing or nut means wherein a resilient volute sleeve element formed to provide an internal spiral groove is secured in novel manner to a rigid housing member.

Another object of this invention is to disclose and provide an elongated volute sleeve element of resilient yieldable elastic material which may be utilized in an anti-friction screw means of ball-bearing type.

A further object of this invention is to disclose and provide a relatively inexpensive anti-friction screw means of ball-bearing type wherein loading among the ball bearings is more uniformly distributed.

A further object of this invention is to disclose and provide a ball-bearing screw jack which is inexpensive to manufacture and which need not be held to rigid manufacturing tolerances.

This invention contemplates a novel method of making a housing or nut means for use with an anti-friction screw means of ball-bearing type and wherein a cylindrical thin wall hollow tube of any selected length may be deformed upon a mandrel having external threads of desired contour so as to provide internal threads of desired contour on the sleeve element. The sleeve element so formed with an internal spiral groove may then be secured along an external spiral path in a rigid load-carrying housing member, the housing member being of any desired selected length.

A still further object of this invention is to provide an anti-friction screw means which may be subjected to pre-loading without detriment to the metal employed, that is, without brinelling or spawling.

Other objects and advantages of this invention may be readily apparent from the following description of the drawings wherein an exemplary embodiment of this invention is illustrated.

In the drawings:

Figure 1 is a sectional view of an anti-friction screw means embodying this invention, the section being taken in a plane passing through the axis of the screw means;

Figure 2 is an end view of the means shown in Figure 1 and taken from the right thereof;

Figure 3 is a fragmentary sectional view taken in the plane indicated by line III—III of Figure 1;

Figure 4 is a side view partly in section of a volute sleeve element used in the means shown in Figure 1;

Figure 5 is an enlarged fragmentary sectional view showing the relationship of the screw member, sleeve element, and ball bearings;

Figure 6 is a diagrammatic view of an apparatus for forming the sleeve element; and Figure 7 is a sectional view taken in a transverse plane indicated by line VII—VII of Figure 5.

Generally speaking, in Figure 1 an anti-friction screw means of ball-bearing type indicated at 10 may comprise an elongated rigid screw member 11 having an external spiral groove therein and an elongated housing or nut means 12 having a volute, relatively resilient, flexible sleeve element 13 received within and secured to the walls of the bore of the housing. The sleeve element 13 forms an internal spiral groove 14, generally complementary to the external groove on the screw member. Ball bearings 16 extend between the internal and external grooves for anti-frictionally mounting the housing means 12 on the screw member 11. Means for recirculating the ball bearings 16 as the housing means is moved axially of the screw member may comprise a tube 17 extending from and connecting one end of a groove or spiral passageway to the other end of the passageway.

In the exemplary screw means, a triple threaded screw member and housing means is illustrated, said triple threading providing three continuous spiral pathways, A, B, and C for the ball bearings. It is understood that the invention contemplates a screw means having one or more spiral passageways arranged to provide a suitable number of parallel circuits or paths for the ball bearings. In the explanation, only the complementary grooves forming one passageway will be referred to for brevity and clarity.

The screw member 11 may comprise an elongated shaft or a part of the shaft employed with a mechanism utilized to transmit and carry axially directed loads, such as, for example, a jack screw, steering wheel apparatus, or pump motors. The screw member 11 is provided with an external spiral groove 20 of selected pitch, diameter and contour. Since the groove 20 is externally formed, it may be accurately machined for its entire length and may provide a virtually rigid non-deformable spiral raceway for a plurality of ball bearings.

The housing means 12 may comprise an elongated housing member 18 of generally tubular or cylindrical form and provided with an open-ended bore 21 of uniform diameter throughout its length. The housing member 18 may be provided with any suitable type of end-connecting means at opposite ends thereof for associating the housing means with a device (not shown) with which the anti-friction screw means is to be employed. In the example shown, one end connecting means 22 may include external threads adapted to engage internal threads on a portion of the device. At the other end of the housing member, end-connecting means 23 may comprise an external spline 24 having a suitably selected number of teeth, pitch, and root diameter. The spline 24 may be formed on a thickened metal section of the housing member. Inwardly of each end-connecting means 22 and 23, the housing member may be provided with enlarged annular shoulder portions 25 and 26. Each portion 25 and 26 may carry generally triagonal collars 27 and 28, respectively, which may be secured thereto in any convenient manner, as by furnace brazing. Each collar and associated shoulder portion may be provided with three generally tangentially arranged passageways 29, 30 and 31, said passageways being angularly spaced approximately 120°. The passageways 29, 30 and 31 communicate with respective spiral passageways A, B, and C, formed by the internal and external grooves of the screw means.

The sleeve element 13 may be formed, as later described, from a cylindrical elongated tube of suitable metal material. The metal material selected may be a nitro-alloy having relatively resilient, elastic and flexible characteristics, as compared to the metal of the screw member. The metal material may have a Brinell hardness of approximately Rockwell 63 C scale. The sleeve element 13 has a virtually uniform thin metal section throughout its length and may be made of any suitable desired length so as to extend between and slightly beyond shoulders 25 and 26 of a selected housing member. The internal groove 14 formed in the sleeve element 13 may have a crest to root radius or race curvature which is slightly greater than the race curvature of the external groove 20 formed in the screw member. The internal groove 14 is generally complementary to the external groove 20 and may be provided with the same pitch. The inner diameter of the sleeve element is slightly greater than the external diameter of the screw member, so that the sleeve element may be sleeved over the screw member when the housing means and screw member are assembled.

The sleeve element 13 may be sleeved within bore 21 of the housing member with outermost surface portions of the sleeve element in close fitting relation therewith. The element 13 may be secured to the housing member, as by furnace brazing. In the example shown, furnace brazing material in any suitable form may be fed into the external passageways 34 formed by the external contour of the volute sleeve element and the internal surface of the housing member. When heat is applied to the housing member and the sleeve element with the brazing material in the external passageways 34, brazing of the sleeve element to the housing member is accomplished and the sleeve element is securely fixed along spiral areas of contact to the housing member. Other methods of securing the sleeve element to the housing member may be employed.

A plurality of ball bearings 16 having a suitably selected diameter dependent upon the contour of the internal and external spiral groves may be interposed between the screw member and the housing means for the purpose of transmitting axial loads therebetween. The ball bearings 16 are continuously arranged in each of the three spiral passageways A, B, and C.

Attention is particularly directed to Figure 5 wherein the ball bearings, volute sleeve element, and screw member are shown under load conditions. In Figure 5 it should be noted that the ball-bearing seats against a curved surface portion 36 of the external groove 20 and contacts the curved surface portion 36 along a virtually tangential line at 37. The opposite surface portion of the ball bearing bears against an internal curved surface portion 38 of the curved wall section 40 of the sleeve element. For purposes of explanation, the contact of the surface of the ball with the surface portion 38 on the wall section 40 is exaggerated so as to illustrate the enlarged bearing or pressure area of contact between the curved surface portion 38 and the ball 16. The enlarged bearing area of contact of ball 16 with the curved surface portion 38 results from resilient yielding of wall section 40 under load conditions. It should be noted that wall section 40 is spaced from walls of the bore of the housing member and that since the sleeve element is secured at spirally arranged and axially spaced areas 33, the curved wall sections 40, 41 and the interconnecting edge wall portion 42 are permitted to slightly yield.

The particular construction referred to above will thus provide a resilient, yieldable, flexible, continuous spiral seat for the portions of the ball bearings lying opposite to the contact of said ball bearings with the external groove 20. Such a continuous spiral resilient seat will permit yielding therealong so that the imposition of loads upon the plurality of ball bearings in each spiral passageway will be virtually uniform throughout the length of the housing means. It should also be noted that the resilient seating of the plurality of ball bearings against the sleeve element avoids the necessity for accurately finishing to the selected race curvature the internal surfaces which form the internal spiral groove 14. As a result, an efficient effective transmission of load is achieved.

Means for recirculating the plurality of ball bearings in each of the spiral passageways may be accomplished by well-known means and may comprise a tube or duct 17 extending between and connected to the respective bores 29, 30 and 31 at opposite ends of the housing member. The means for recirculating is only generally indicated because the particular type of tube or duct employed does not form a part of this invention.

It is understood that the ball bearings may be of uniform size or may include alternately arranged ball bearings of large and small diameter. The total length of the plurality of ball bearings in contact with any one passage is less than the total length of said passageway so that some spacing may be afforded between individual ball bearings.

An anti-friction screw means is thus provided wherein the outer spiral raceway for the ball bearings is flexible, resilient and elastic relative to the inner rigid spiral raceway. Forces transmitted by the ball bearings between the inner raceway and the outer raceway are directed through the flexible curved wall sections 40 of the sleeve element and said wall sections 40 may slightly yield thereto. As a result, minute differences in sizes of ball bearings, the contour of the rigid inner raceway, and the flexible outer raceway will not cause undue loading of individual ball bearings, but instead the flexibility of the outer raceway will yield to such undue loading and cause more uniform distribution of load among said bearings.

The flexible yieldable outer raceway further permits selected preloading of the ball bearings, if desired, because the flexible characteristics of the external thread will prevent overloading of individual ball bearings which might result in brinelling of the metal of the raceway or other damage thereto.

The invention also contemplates a novel method for making a volute sleeve element of any selected length for use with the housing means above-described. In Figures 6 and 7 are diagrammatically illustrated an apparatus which may be employed in the making of such a volute sleeve element.

The apparatus shown in Figure 6 includes a mandrel 44 provided with external spiral grooves 45 of the desired pitch and contour and of the desired diameter. An elongated cylindrical tube member 46 of uniform thin walled section may be sleeved over said mandrel and held at one end thereof adjacent the base of the mandrel. A forming die means 47 carried by the apparatus may be mounted for longitudinal movement along the mandrel as the mandrel is rotated. The die has a plurality of die elements 48 arranged in this example so that each element may form one of the threads of the triple threaded outer race. Each die element is adapted to extend within the external groove on the mandrel for rolling and deforming the metal of the cylinder against the surfaces of the groove of the mandrel. The forming die means 47 is initially positioned at the end of the mandrel opposite to the end at which the tube member is held. Upon advancement of the die means to the opposed end of the tube, each die element is urged over the end of the tube and the metal thereof is formed to the configuration of the mandrel. After the forming die has reached the end of the mandrel, it may be removed from contact with the cylindrical tube and the now formed volute sleeve element may be removed from the mandrel.

It will thus be apparent that the forming of a volute sleeve element having an accurately determined internal spiral groove may be readily made of any selected length, since machining of the internal spiral groove is not necessary and since the resilient wall sections of the groove may yield to uniformly load the ball bearings in the spiral passageways. A novel means is thus provided for making housing means for ball bearing jack screws of any selected length.

It is understood by those skilled in the art that other apparatus may be provided for forming a volute sleeve element, and other means may be provided for mounting the sleeve element in a housing member. It should be also noted that while the sleeve element is secured to the housing member along a spiral path, it may be desirable to fix the sleeve element to the housing member at more widely spaced points so as to provide additional resiliency and yieldability of the sleeve element under load conditions.

It is understood that various modifications and changes may be made in the construction of the housing means which may fall within the spirit of this invention, and all such changes and modifications coming within the scope of the appended claims are embraced thereby.

I claim:

1. An anti-friction screw device comprising: an elongated screw member having an external spiral groove; an elongated housing means movable relative to the screw member; said housing means including an elongated voluted sleeve element of resilient yieldable material and of virtually uniform metal section, said sleeve element providing an internal spiral groove having a crest to root radius greater than the crest to root radius of the external spiral groove and complementary to said external groove; a plurality of ball bearings extending between said internal and external grooves for transmitting force between the screw member and the housing means, said sleeve element providing a virtually resilient nondeformable wall section providing a bearing seat for said ball bearings; said housing means including an elongated housing member having an axial bore for snugly receiving said sleeve element therein; means for securing the housing member and said sleeve element together; and means for recirculating said ball bearings from one end to the other end of said housing means upon relative axial movement of the housing means with respect to the screw member.

2. An anti-friction screw device comprising: an elongated screw member having an external spiral groove; an elongated housing means movable relative to said screw member; said housing means including a housing member having an axial bore and an elongated voluted sleeve element snugly received within said bore and secured to said housing member, said sleeve element being of resilient material and of virtually uniform metal section, said sleeve element providing an internal spiral groove larger than the groove of the screw member and complementary thereto; a plurality of ball bearings extending between said internal and external grooves for transmitting force between the screw member and the housing means, said sleeve element providing a virtually resilient yieldable bearing area for said ball bearings whereby virtually uniform loading of said ball bearings is afforded; and means for recirculating said ball bearings from one end to the other end of said housing means upon relative axial movement of the housing means with respect to the screw member.

3. An anti-friction screw device comprising: an elongated screw member having an external spiral groove; an elongated housing means movable relative to said screw member; said housing means including an elongated sleeve element of resilient material and having an internal spiral groove complementary to said external groove and a housing member to support said sleeve element by engaging said sleeve element external to said internal spiral groove; a plurality of ball bearings extending between said internal and external grooves for transmitting force between the screw member and the housing means, said sleeve element providing a virtually resilient bearing area for said ball bearings; and means for recirculating said ball bearings from one end to the other end of said housing means upon relative axial movement of the housing means with respect to the screw member.

4. An anti-friction screw and nut assembly comprising: an elongated screw member having an external spiral groove; an elongated nut means movable relative to said screw member; said nut means including a voluted sleeve element of resilient yieldable material and of virtually uniform metal section, said sleeve element providing an internal spiral groove having a crest to root radius greater than the crest to root radius of the external spiral groove and complementary to said external groove; a plurality of ball bearings extending between said internal and external grooves for transmitting force between the screw member and nut means, said sleeve element providing a virtually resilient yieldable bearing area for said ball bearings; and means for recirculating said ball bearings from one end to the other end of said nut means upon relative axial movement of the nut means with respect to the screw member.

5. An anti-friction screw and nut assembly comprising: an elongated screw member having an external spiral groove; an elongated nut means movable relative to said screw member; said nut means including a thin wall sleeve element providing an internal spiral groove complementary to said external groove; a plurality of ball bearings extending between said internal and external grooves for transmitting force between the screw member and nut means, said sleeve element providing a yieldable bearing area for said ball bearings upon relative axial movement of the nut means with respect to the screw member.

6. An anti-friction screw device including a screw member having an external groove, the combination of: a housing means for cooperation with the screw member and including an elongated hollow housing member having an internal bore, and a volute sleeve element of uniform thin wall section snugly received within the bore and providing an internal spiral groove virtually complementary to the external groove of the screw member; and means securing the sleeve element to the housing member.

7. A housing means for a ball-bearing screw means comprising: a housing member of a length greater than twice the diameter of the screw means associated therewith and provided with an axial bore for its length; and an elongated sleeve element having internal spiral grooves therein of selected contour, said sleeve element having supporting contact with the bore of said housing member along exterior longitudinally spaced areas opposite root portions of the internal thread.

References Cited in the file of this patent

UNITED STATES PATENTS

| | | |
|---|---|---|
| 426,439 | Fife | Apr. 29, 1890 |
| 687,464 | Sullivan | Nov. 26, 1901 |
| 1,831,080 | Schmidt | Nov. 10, 1931 |
| 1,855,482 | McArthur | Apr. 26, 1932 |
| 2,380,662 | Means | July 31, 1945 |
| 2,416,964 | Stull | Mar. 4, 1947 |
| 2,657,617 | Hussnigg | Nov. 3, 1953 |
| 2,724,979 | Cross | Nov. 29, 1955 |
| 2,729,266 | Humphrey | Jan. 3, 1956 |